United States Patent
Koga

(10) Patent No.: US 6,517,338 B1
(45) Date of Patent: Feb. 11, 2003

(54) SET OF MOLDING DIES FOR FUEL-CELL SEPARATOR

(75) Inventor: Hajime Koga, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 38 days.

(21) Appl. No.: 09/655,399

(22) Filed: Sep. 5, 2000

(30) Foreign Application Priority Data

Sep. 7, 1999 (JP) ............................................. 11-253217

(51) Int. Cl.[7] .............................................. B29C 51/18
(52) U.S. Cl. ........................................ 425/412; 425/416
(58) Field of Search ......................... 425/78, 412, 416, 425/195, 193; 264/125; 249/102

(56) References Cited

U.S. PATENT DOCUMENTS 3,650,646 A * 3/1972 Kirkpatrick et al. .......... 425/78
4,217,401 A * 8/1980 Pellegri et al. ............... 429/39

FOREIGN PATENT DOCUMENTS

| | | |
|---|---|---|
| DE | 3005474 | 8/1981 |
| JP | 56-127703 | 6/1981 |
| JP | 56-127703 | 10/1981 |
| JP | 62-3299 | 1/1987 |
| JP | 62-98162 | 6/1987 |
| JP | 4-168201 | 6/1992 |
| JP | 9-125104 | 5/1997 |
| JP | 9-150298 | 6/1997 |
| JP | 10-40937 | 2/1998 |
| JP | 2001-338652 | * 7/2001 |

* cited by examiner

Primary Examiner—Jan H. Silbaugh
Assistant Examiner—Thu Khanh T. Nguyen
(74) Attorney, Agent, or Firm—Smith, Gambrell & Russell, LLP

(57) ABSTRACT

To produce a fuel-cell separator formed with a plurality of protuberances on its base plate, a lower die is assembled by stacking a plate in intimate contact with a lower-die base with a mirror-finished surface, the plate having a plurality of through holes extended therethrough and a uniform thickness. A side frame is stacked on the lower die to charge a molding material therein. Then, the material is heated and compressed with an upper die to mold an article with protuberances having a constant height and a constant flatness at their top surfaces.

3 Claims, 8 Drawing Sheets

SET OF MOLDING DIES FOR FUEL-CELL SEPARATOR

FIELD OF THE INVENTION

The present invention relates to techniques for producing fuel cell separators.

DESCRIPTION OF THE PRIOR ART

A fuel battery is of a stack structure constructed from a plurality of stacked single cells as unit components. FIG. 9 is a fragmentary sectional view of a single cell 100 constituting a solid polymer electrolyte fuel battery such as disclosed in Japanese Unexamined Patent Publication No. 10-3931 (1998). The single cell 100 includes an electrolyte membrane 101, an anode 102 and a cathode 103 sandwiching the electrolyte membrane 101 therebetween, and a pair of separators 104 sandwiching the anode-cathode pair.

The pair of anode 102 and cathode 103 sandwiching the electrolyte membrane 101 therebetween form gas diffusion electrodes. The separator 104 acts as an electrical conductor for the gas diffusion electrode and also as a structure providing gas flow channels defined by a plurality of protuberances formed on a surface of its base plate 104a. A gas flow channel between the anode 102 and the separator 104 is a fuel gas channel P1, whereas a gas flow channel between the cathode 103 and the separator 104 is an oxidizer gas channel P2.

FIG. 7 is a perspective view showing an exemplary separator 104. The separator 104 is constructed such that a plurality of protuberances 104b are arranged on a surface of the base plate 104a. The separator 104 is constructed from a gas impermeable conductive member such as of a molded carbon article formed of an electrically conductive carbon material compressed for reduced gas permeability.

FIG. 8 is a sectional view showing a state where the separator 104 is molded. The separator 104 is produced by the steps of charging conductive carbon into a lower die 105 of a predetermined shape, and heating the conductive carbon under pressure with an upper die 106.

Holes 105a in the lower die 105 for forming the protuberances 104b are produced by machine work using a drill, end mill or the like.

Unfortunately, the holes 105a machined using a tool, such as drill, end mill or the like, tend to suffer an inadequate depth precision because the tool is worn to cut the holes short of depth. In addition, the worn tool results in the hole 105a with round bottom, the circumferential edge of which is also rounded. Hence, it is difficult to ensure that the protuberances 104b have constant planar top surfaces.

As a result, the molded separator 104 detrimentally has the protuberances 104b which are irregular in height and poor in flatness at top surfaces thereof. The use of such a separator 104 in the fuel cell entails a problem that the separator contacts the anode 102 or the cathode 103 on a reduced area to increase contact resistance.

OBJECT AND SUMMARY OF THE INVENTION

In view of the foregoing, it is an object of the present invention to provide a set of molding dies, molding structure and molding process for fuel-cell separator with the protuberances of a constant height and a constant flatness at the top surfaces thereof.

In accordance with the present invention for achieving the above object, a set of molding dies for fuel-cell separator formed with a group of protuberances on its base place comprises:

a lower-die base having its surface finished to a predetermined surface roughness;

a plate disposed in intimate contact with the surface to thereby form a lower die together with the lower-die base and having a predetermined uniform thickness and a plurality of through holes extended in a direction of its thickness; and a side frame disposed on a periphery of the plate and having a predetermined height.

In the molding dies of the above construction, the group of protuberances of the fuel-cell separator are formed by plural minor cavities defined by the plural through holes in the plate and the surface of the lower-die base. The top surfaces of the protuberances are formed by the surface of the lower-die base, which is finished to the predetermined surface roughness. Accordingly, the top surfaces of the protuberances are finished to the predetermined surface roughness. The height of the protuberances is determined by the thickness of the plate so that the protuberances have the predetermined uniform height. Thus is ensured that the protuberances have the constant height and the constant flatness at their top surfaces.

In the above set of molding dies, the through hole may be progressively increased in size from one side on the lower-die base toward the other side.

In this case, the protuberances of the molded fuel-cell separator are readily released from the through holes during the removal of the separator. This facilitates a releasing operation.

In accordance with the present invention for achieving the above object, a molding structure for fuel-cell separator comprises:

a lower-die base having its surface finished to a predetermined surface roughness;

a plate disposed in intimate contact with the surface to thereby form a lower die together with the lower-die base and having a predetermined uniform thickness and a plurality of through holes extended in a direction of its thickness;

a side frame disposed on a periphery of the plate and having a predetermined height;

a molding material for fuel-cell separator charged into a cavity having its bottom defined by the plate and its side wall surfaces defined by inside surfaces of the side frame; and an upper die inserted in the side frame for compressing the molding material.

In the molding structure of the above construction, the molding material for fuel-cell separator is charged into the cavity with its bottom defined by the plate and the side wall surfaces defined by the inside surfaces of the side frame and then is compressed by the upper die for formation of the base plate of the fuel-cell separator. The plural protuberances of the fuel-cell separator are formed by the minor cavities defined by the plural through holes in the plate and the surface of the lower-die base. That is, the top surfaces of the protuberances are formed by the surface of the lower-die base, which is finished to the predetermined surface roughness. Accordingly, the top surfaces of the protuberances are finished to the predetermined surface roughness. The height of the protuberances is determined by the thickness of the plate, thus resulting in the predetermined uniform height. Thus is ensured that the protuberances have the constant height and the constant flatness at their top surfaces.

In accordance with the present invention for achieving the above object, a molding process for fuel-cell separator comprises the steps of:

placing a plate in intimate contact with a surface of a lower-die base finished to a predetermined surface roughness, the plate having a predetermined uniform thickness and a plurality of through holes extended in the direction of its thickness;

placing a side frame of a predetermined height on a periphery of the plate;

charging a molding material for fuel-cell separator into a cavity having its bottom defined by the plate and side wall surfaces defined by inside surfaces of the side frame;

inserting an upper die in the side frame for compressing the molding material;

heating the compressed molding material for forming the material into shape; and releasing the molded fuel-cell separator from the upper die, side frame, lower-die base and plate.

In the above molding process for fuel-cell separator, the molding material for fuel-cell separator is charged into the cavity with bottom defined by the plate and side wall surfaces defined by the inside surfaces of the side frame and then, is heated as compressed with the upper die for formation of the base plate of the fuel-cell separator. On the other hand, the plural protuberances of the fuel-cell separator are formed by the plural minor cavities defined by the plural through holes in the plate and the surface of the lower-die base. The top surfaces of the protuberances are formed by the lower-die base surface which is finished to the predetermined surface roughness. The height of the protuberances is determined by the thickness of the plate, so that the protuberances have a uniform height. That is, the fuel-cell separator featuring the protuberances of the constant height and the constant flatness at their top surfaces is obtained by releasing a molded article from the upper die, side frame, lower-die base and plate.

BRIEF DESCRIPTION OF THE DRAWINGS

FIG. 3 is a perspective view showing the die of FIG. 2 with an upper die pressed in;

DESCRIPTION OF THE PREFERRED EMBODIMENTS

Figure 1:
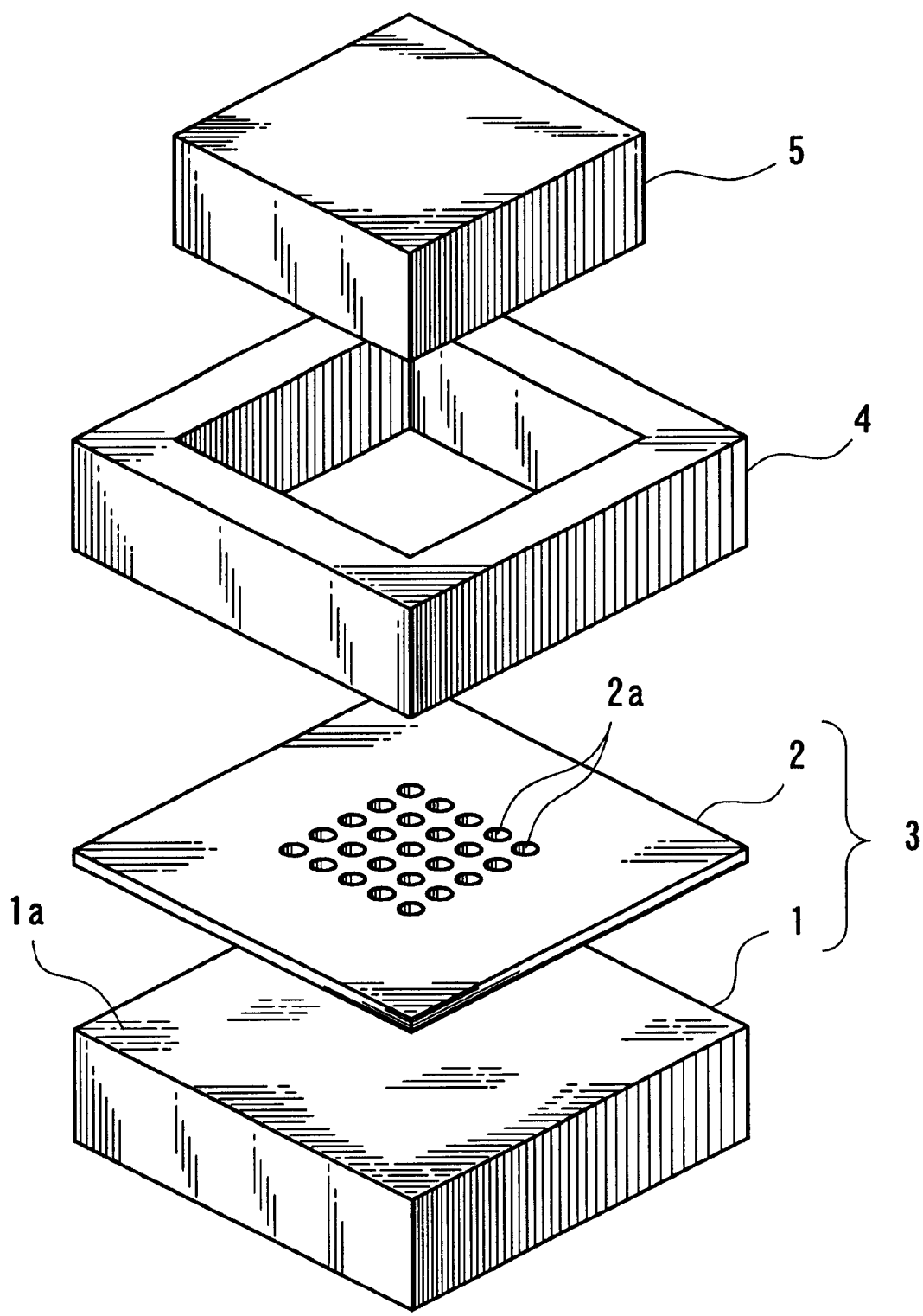
FIG. 1 is an exploded perspective view showing a set of molding dies for fuel-cell separator according to a first embodiment of the present invention.

FIG. 1 is an exploded perspective view showing a set of molding dies for fuel-cell separator (or a molding structure) according to a first embodiment of the present invention. The molding dies include a lower die 3 consisting of a rectangular parallelepiped lower-die base 1 and a plate 2, a side frame 4, and a rectangular parallelepiped upper die 5. The lower-die base 1 has a surface 1a of high quality plane which is mirror-finished to surface roughness of 0.1 µmRa or less by polishing/lapping. The plate 2 is disposed in intimate contact with the surface 1a of the lower-die base 1 and has a predetermined uniform thickness (not less than 0.2 mm, e.g., 0.5 mm). The plate 2 is formed with a plurality of through holes 2a extended in the direction of its thickness. These through-holes are produced by machine work using a drill. Since the drill passes through the plate 2, the hole depth is in perfect coincidence with the thickness of the plate 2. The side frame 4 is disposed on a periphery of the plate 2 and has a predetermined height. The upper die 5 is inserted in the side frame 4 for compression of the molding material.

Figure 2:
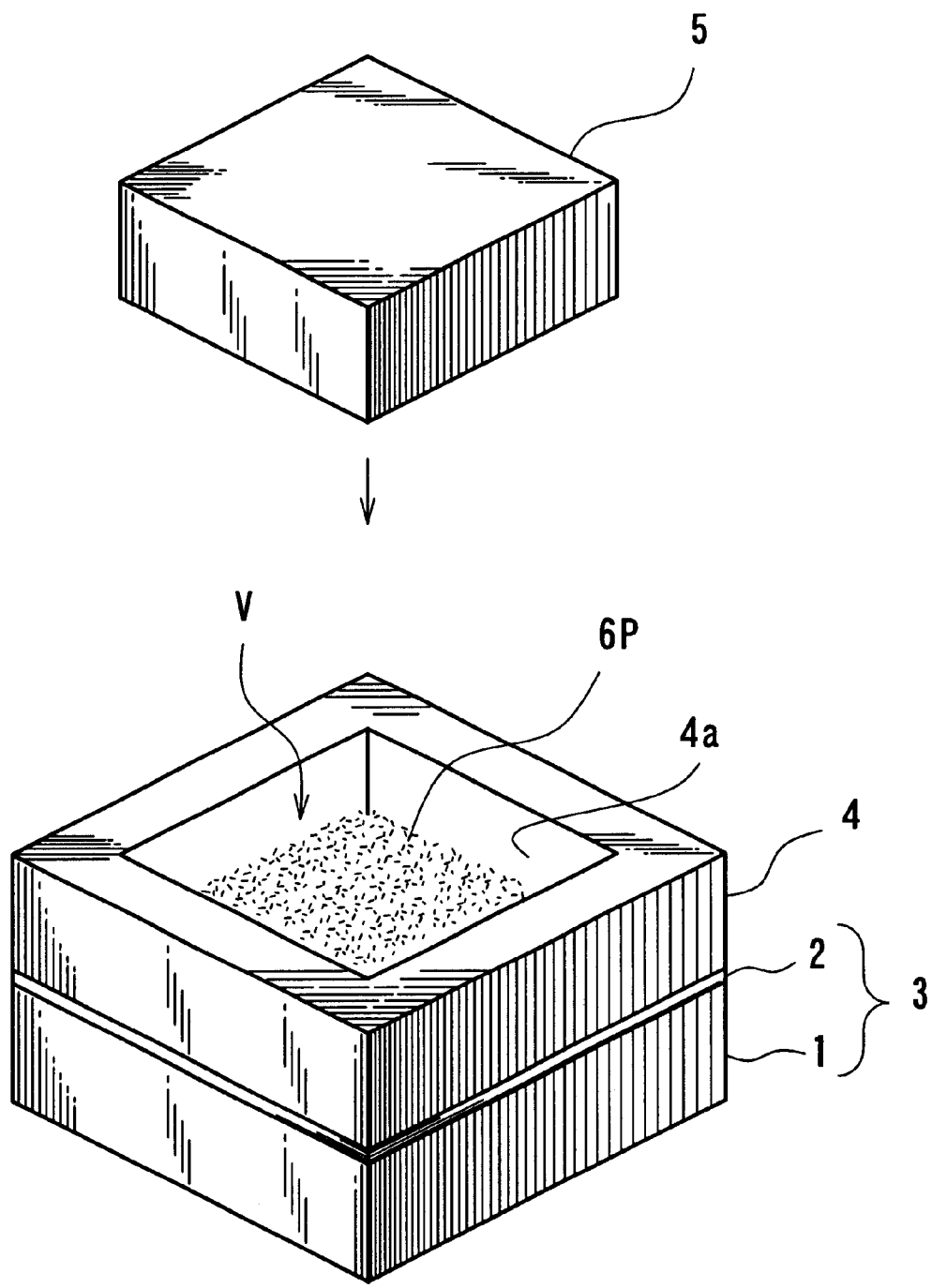
FIG. 2 is a perspective view showing the molding dies of FIG. 1 wherein a molding material is charged into a side frame stacked on a lower die.
Figure 3:
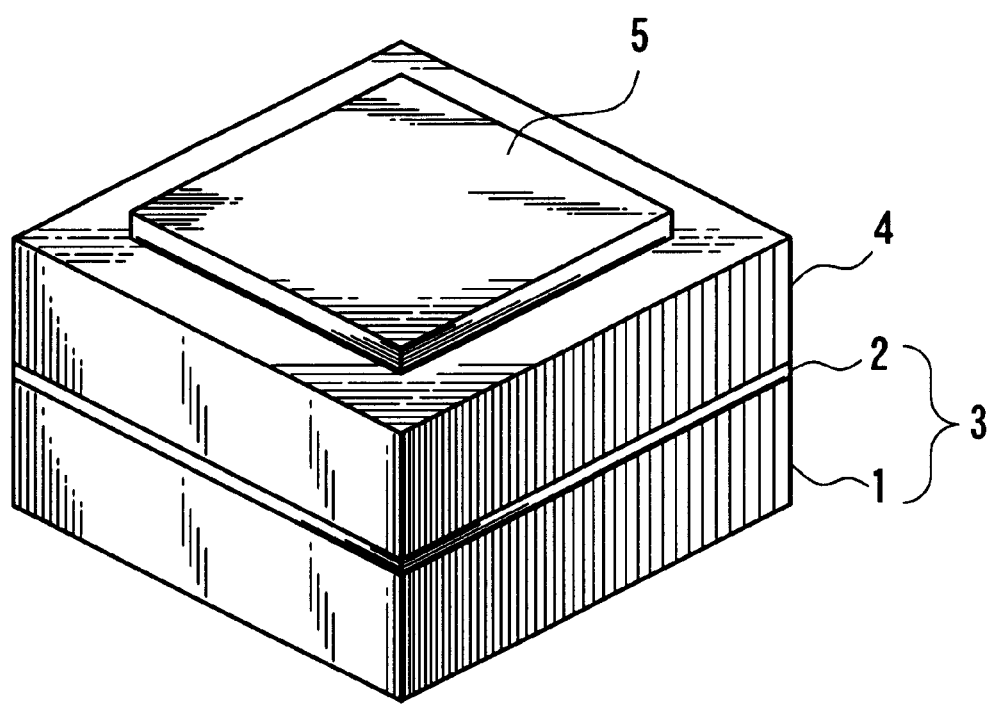

Next, description will be made on a process of molding the fuel-cell separator using the set of dies of the above construction. As shown in FIG. 2, the plate 2 is placed on the lower-die base 1 in intimate contact therewith and then, the side frame 4 is stacked on the plate 2. In this state, molding material 6P for fuel-cell separator (hereinafter simply referred to as "separator") is charged into a cavity V having a bottom defined by the plate 2 and side wall surfaces defined by inside surfaces 4a of the side frame 4. Preferred as the molding material 6P is a composition obtained by adding a given amount of thermosetting resin (for example, a phenol resin) to binding particles (for example, expandable graphite particles), graphite particles or electrically conductive carbon particles, because such a composition features an excellent electrical conductivity. Next, the upper die 5 is pressed in the side frame (see FIG. 3) to compress the molding material while the dies as a whole are heated for compression molding with heat. In this process, the pressure on the molded surface is preferably in the range of 150 to 300 kgf/cm$^2$ whereas the molding temperature is preferably in the range of 140 to 180° C. It is preferred to preheat the plate 2 to the molding temperature because the plate 2 may suffer warpage caused by temperature difference between the both sides thereof.

Figure 4:
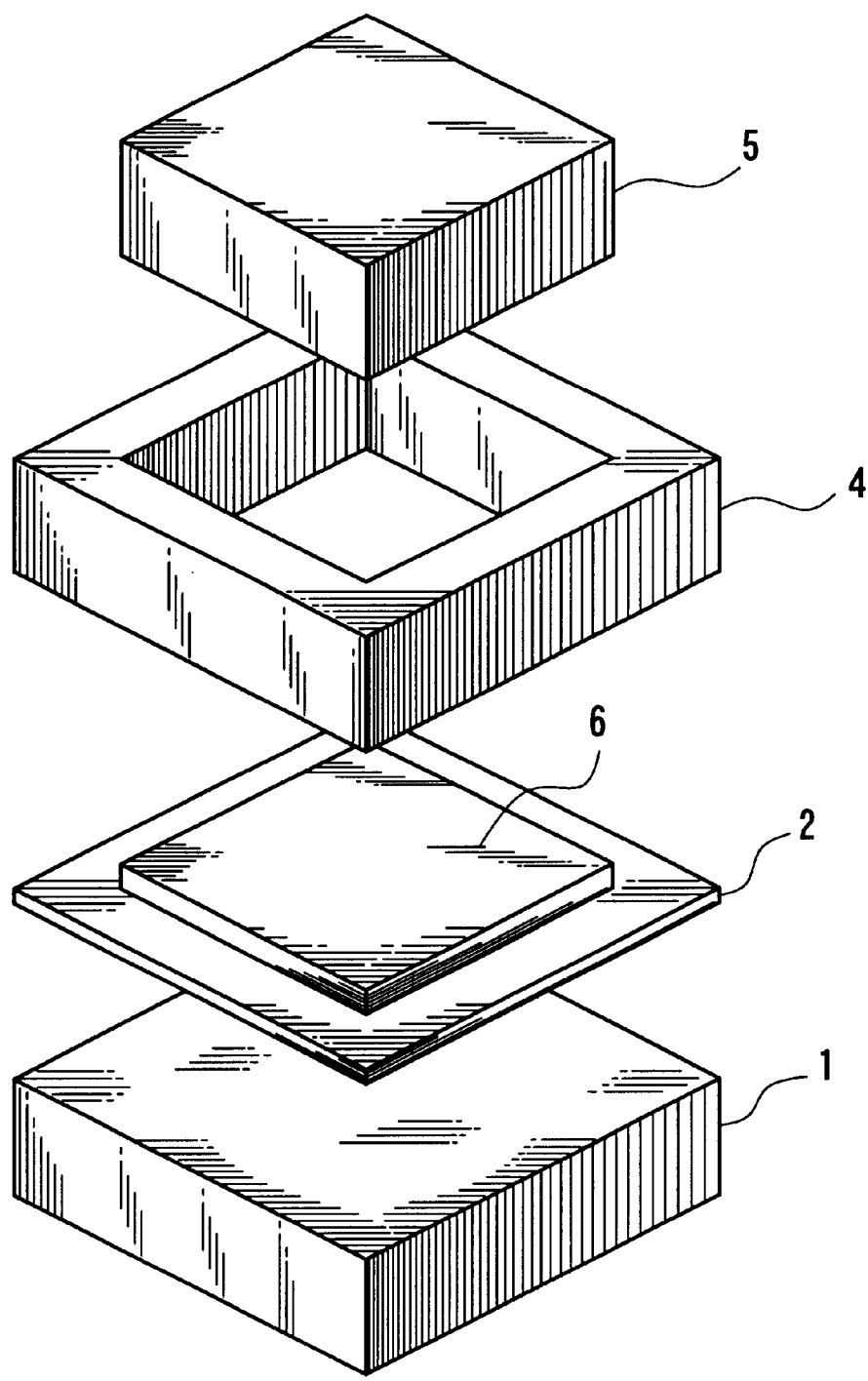
FIG. 4 is an exploded perspective view showing a procedure of releasing a molded article from the above dies.

After completion of the molding, the upper die 5 and the side frame 4 are removed and then, the plate 2 with the molded separator 6 adhered thereto is released from the lower-die base 1, as shown in FIG. 4.

Figure 5:
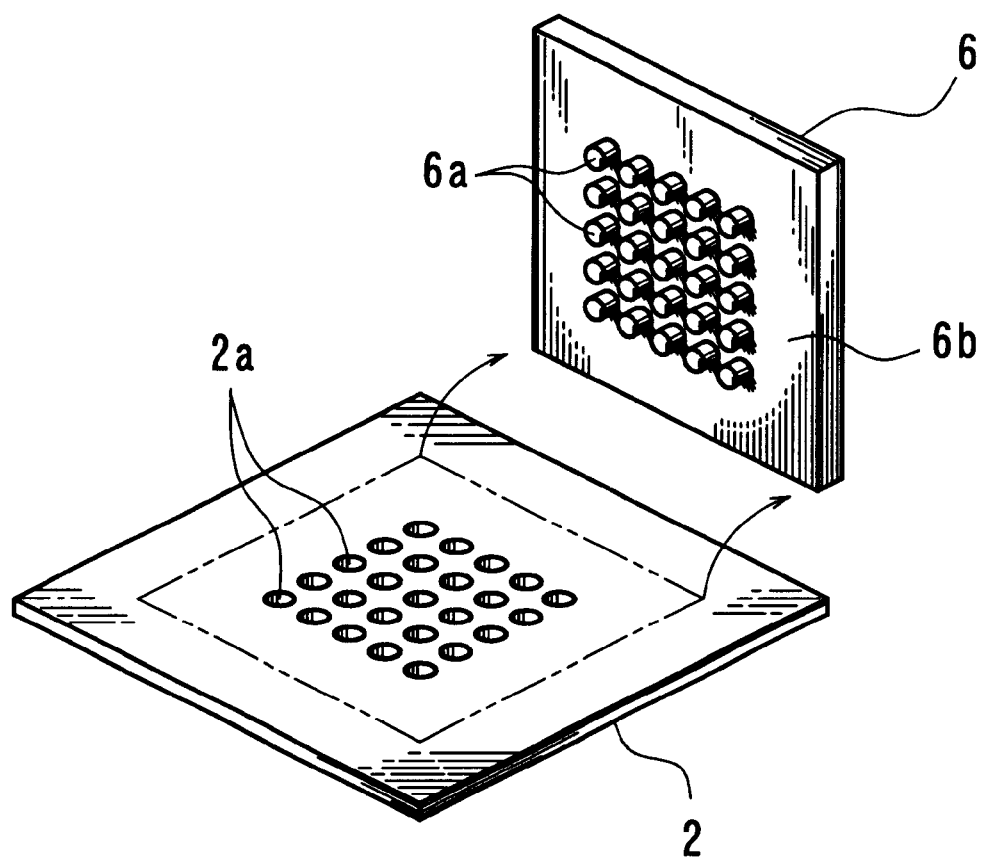
FIG. 5 is a perspective view showing a fuel-cell separator released from a plate of the above molding die.

Subsequently, the separator 6 is released from the plate 2 using known sucking means (not shown), as shown in FIG. 5. Thus is obtained the separator 6 wherein a plurality of protuberances 6a are arranged on a base plate 6b. The height of the protuberances 6a of the separator 6 is determined by the depth of the through holes 2a in the plate 2, or the thickness of the plate 2. Therefore, the protuberances 6a have a uniform height. The flatness of the top surfaces of the protuberances 6a is determined by the surface 1a (FIG. 1) of the lower-die base 1. Therefore, the top surfaces of the protuberances 6a feature a good, uniform flatness by virtue of the aforementioned mirror-finished base surface.

When the resultant separator 6 is incorporated in a single cell of the fuel battery, the protuberances 6a contact the anode or cathode on the overall top surfaces thereof so as to attain a sufficient contact area. This results in a reduced contact resistance.

Because of the lower die 3 constructed from the separate lower-die base 1 and plate 2, the lower-die base 1 has such a simple form while the through holes 2a are readily machined in the plate 2. This contributes to the reduced die fabrication costs. Furthermore, such a construction facilitates the cleaning of the plate 2 and lower-die base 1 after the release of the separator 6. In addition, the lower-die base 1 may be used over an extended period of time by changing only the plate 2 based on the number of use of the plate which is produced at relatively low costs.

Figure 6:
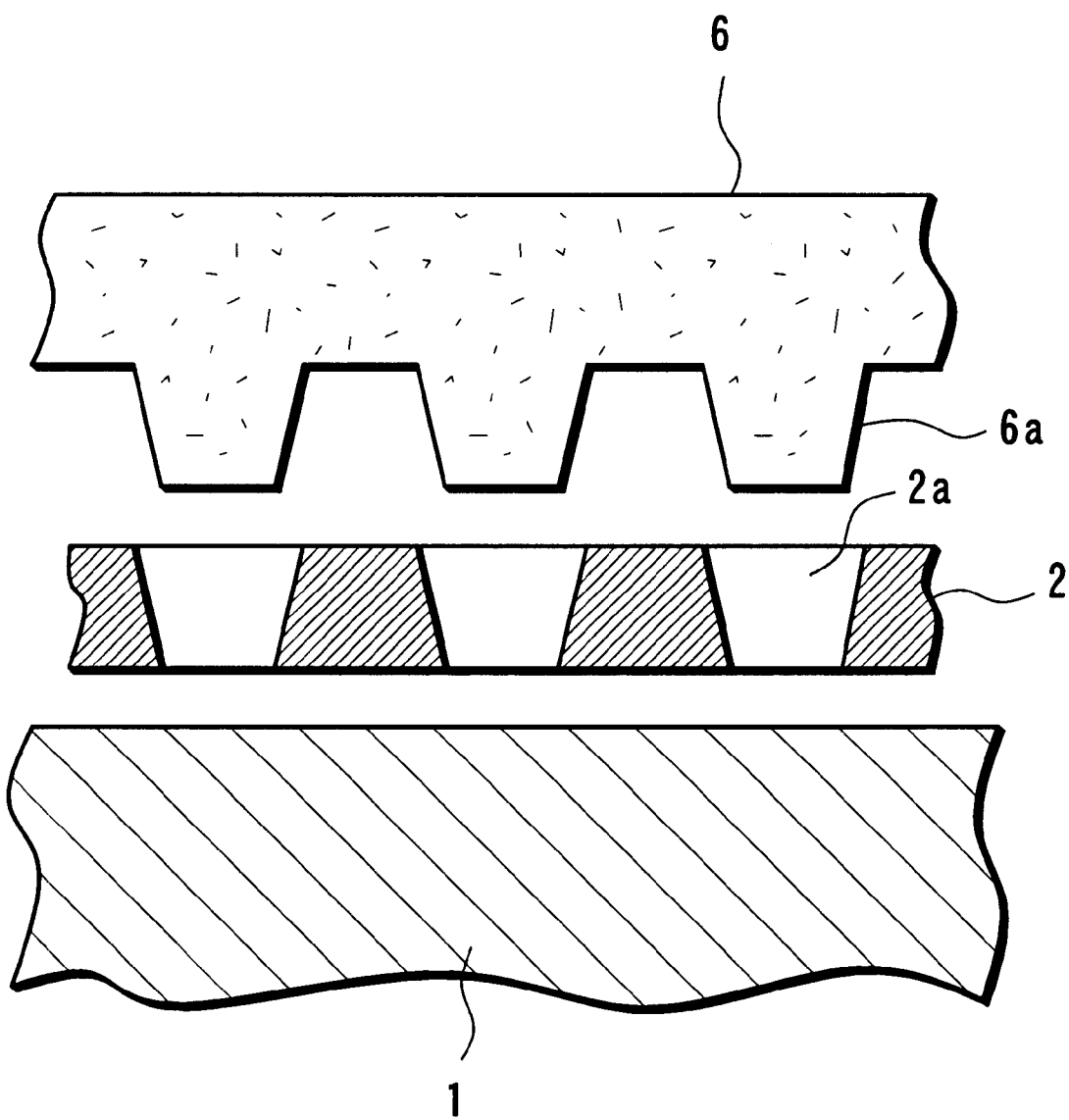
FIG. 6 is a sectional view showing a part of a set of molding dies for fuel-cell separator according to a second embodiment hereof.
Figure 7:
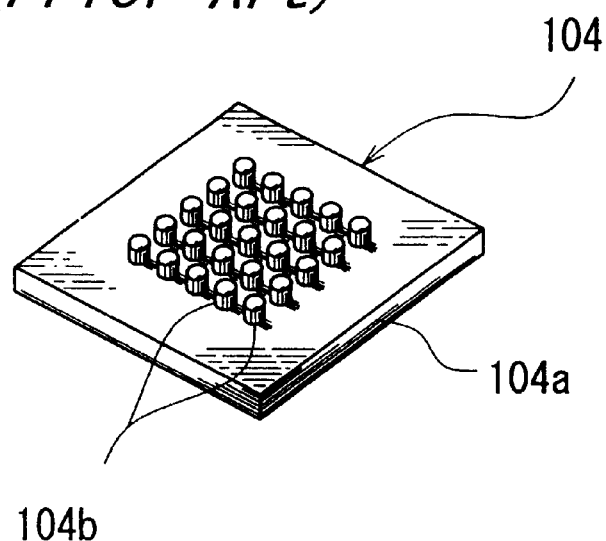
FIG. 7 is a perspective view showing an exemplary separator.
Figure 8:
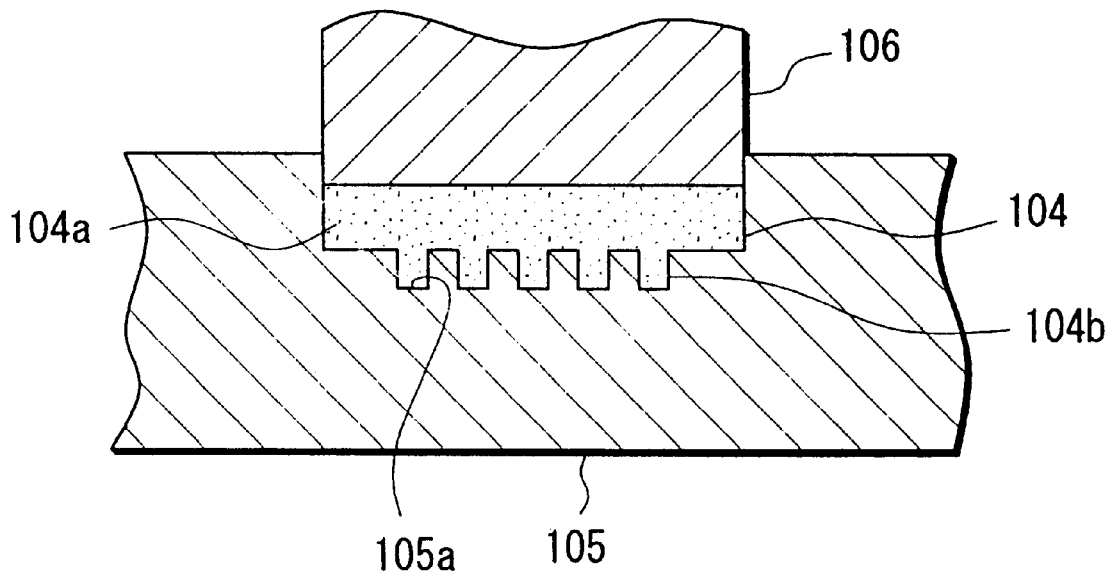
FIG. 8 is a sectional view showing a state where the separator is molded according to a conventional molding process.
Figure 9:
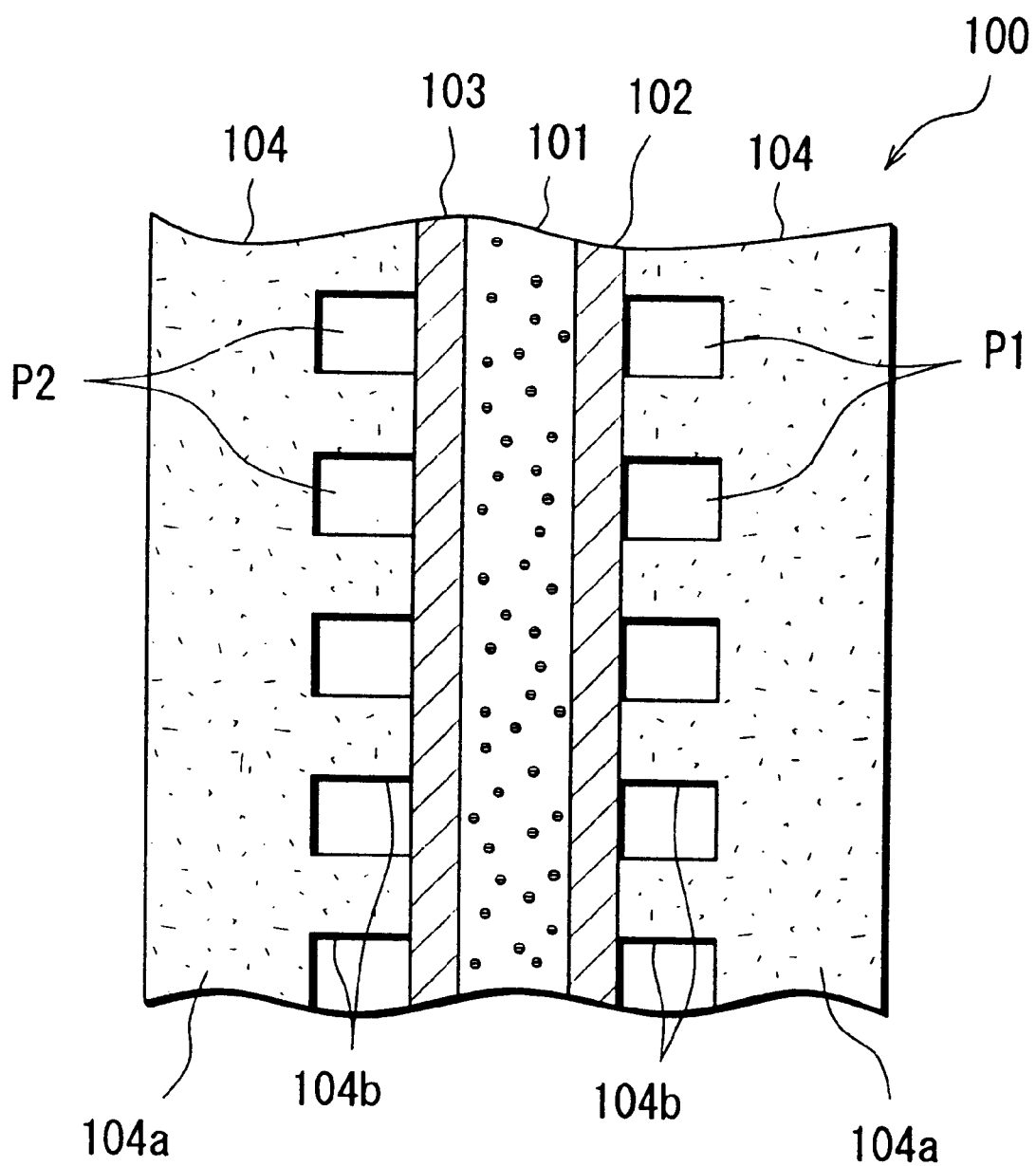
FIG. 9 is a sectional view showing a part of a single cell constituting a solid polymer electrolyte fuel battery.

FIG. 6 is a sectional view showing a set of molding dies for fuel-cell separator according to a second embodiment hereof. In this embodiment, an inside wall of the through hole 2a of the plate 2 is not perpendicular to the surface of the lower-die base 1 but inclined at a given angle so that the diameter of the through hole 2a is progressively increased toward an upper end. That is, the through hole 2a is shaped like a truncated cone. The inside wall is preferably inclined at an angle of 1 to 10°. The other features regarding the construction and the molding process are the same as those of the first embodiment.

The inclined inside walls of the through holes 2a provide an easy release of the protuberances 6a when the molded separator 6 is released from the plate 2. This facilitates the releasing operation.

It is noted that the through hole 2a may not necessarily have a linear inclination. In short, the through hole 2a only need be constructed such that its diameter is progressively increased from one side on the lower-die base 1 toward the other side (the upper end).

In the foregoing embodiments, the plate 2 is formed with round through holes 2a. Alternatively, the plate 2 may be formed with square through holes, which may be formed by, for example, a punching press.

What is claimed is:

1. A set of molding dies for fuel-cell separator formed with a group of protuberances on its base plate comprising:

a lower-die base having its surface finished to a predetermined surface roughness;

a plate disposed in intimate contact with said surface to thereby form a lower die together with said lower-die base and having a predetermined uniform thickness and a plurality of through holes extended in a direction of its thickness; and a side frame disposed on a periphery of said plate and having a predetermined height.

2. The set of molding dies for fuel-cell separator claimed in claim 1, wherein each of said through hole is progressively increased in size from one side on said plate toward an opposite side.

3. A molding structure for fuel-cell separator comprising:

a lower-die base having its surface finished to a predetermined surface roughness;

a plate disposed in intimate contact with said surface to thereby form a lower die together with said lower-die base and having a predetermined uniform thickness and a plurality of through holes extended in a direction of its thickness;

a side frame disposed on a periphery of said plate and having a predetermined height;

a molding material for fuel-cell separator charged into a cavity having its bottom defined by said plate and its side wall surfaces defined by inside surfaces of said side frame; and an upper die inserted in said side frame for compressing said molding material.

* * * * *

UNITED STATES PATENT AND TRADEMARK OFFICE
CERTIFICATE OF CORRECTION

PATENT NO.    : 6,517,338 B1
DATED         : February 11, 2003
INVENTOR(S)   : Hajime Koga It is certified that error appears in the above-identified patent and that said Letters Patent is hereby corrected as shown below:

<u>Column 6,</u>
Line 12, change "through hole" to -- through holes --.

Signed and Sealed this

Eighth Day of April, 2003

JAMES E. ROGAN
*Director of the United States Patent and Trademark Office*